June 28, 1949.  S. P. WHEELER  2,474,295
SCREW DRIVER
Filed Sept. 10, 1945
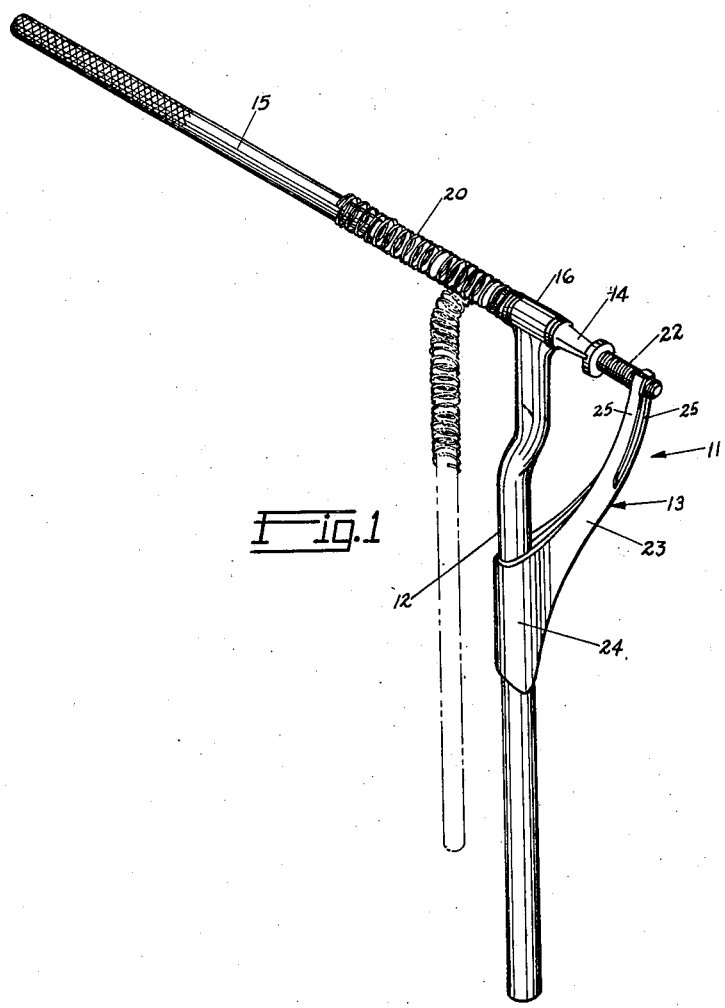
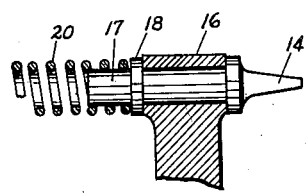
INVENTOR.
Stephen P. Wheeler
BY
Ralph L. Chappell
ATTORNEY.

Patented June 28, 1949

2,474,295

UNITED STATES PATENT OFFICE 2,474,295

SCREW DRIVER

Stephen P. Wheeler, Norristown, Pa.

Application September 10, 1945, Serial No. 615,486

1 Claim. (Cl. 145—50)

(Granted under the act of March 3, 1883, as amended April 30, 1928; 370 O. G. 757)

This invention relates in general to a tool and in particular to a screw driver.

It is frequently necessary in construction and repairing operations to have a screw driver which is capable of reaching into relatively inaccessible places. For example, on numerous occasions it is necessary to tighten or loosen screws where there is insufficient clearance for the conventional type of screw driver.

Accordingly it is an object of this invention to provide a new screw driver which is capable of being used in difficulty accessible places.

It is a further object of this invention to provide a screw driver which is adapted to be operated from a position to the side of the screw which is being worked on.

It is an additional object of this invention to provide a combination screw holder and screw driver which is suitable for use on relatively inaccessible screws.

Further objects and advantages of this invention, as well as its construction, arrangement and operation, will be apparent from the following description and claims in connection with the accompanying drawings, in which Figure 1 is an isometric view of the screw driver according to one embodiment of this invention showing the screw driver in its normal position and indicating its position for use in difficult places.

Figure 2 is an enlarged view partially in section of the driving portion of the screw driver.

Referring to the figures in detail in Figure 1 there is shown a screw driver generally designated 11 comprising a side arm 12, a screw holder 13, a blade 14 rotatably mounted on the arm 12 and a turning shaft 15 operably and flexibly connected with the blade 14.

The side arm comprises a handle optionally curved, ending in a collar or sleeve 16 adapted to receive a rotating shaft 17. Rotatably mounted within this sleeve is a shaft 17 ending in blade 14 (see Figure 2). The shaft 17 has a pair of flanges 18 adapted to prevent it from sliding out of this sleeve.

A flexible turning means, shown in Figures 1 and 2 as spring 20, is integrally fastened to shaft 17 and is adapted to apply a rotating force to the shaft 17. The other end of the flexible turning means 20 is fastened to a knurled shaft 15 or the like. The flexible turning means 20 is so constructed that it transmits a rotating force from knurled shaft 15 to blade 14 whether handle 15 is positioned at right angles to arm 12 or is bent at any desired angle thereto, as indicated by the dotted lines in Figure 1.

The blade 14 is shown in the figures as a conventional screw driver blade, but it is to be understood that it may alternatively be a suitable hexagonal or pronged member or the like, adapted to fit one of the numerous types of variety screw or bolt heads. Accordingly, the word "blade" as used in the specification and claims denotes any one of these devices for engaging a screw or bolt head.

A screw holder 13 is slidably mounted on arm 12 and is so positioned as to afford means positioned upon the screw driver for holding a screw 22 in a desired working position. This screw holder 13 optionally comprises an arm 23 mounted upon a sleeve 24 and terminating in a plurality of fingers or claws 25 adapted to retain the screw 22. These claws 25 preferably retain screw 22 comparatively loosely so that the screw holder 13 may readily be withdrawn from the screw after it is started in the screw hole.

In the use and operation of this screw driver a screw 22 is placed in the screw holder 23 and the assembly is then moved, to place the screw in the desired working position. Handle 15 is then turned, tightening the screw. If desired, the final tightening operation may be accomplished by means of a wrench or a rigid screw driver in order to obtain better leverage.

A like but reverse process is used to remove a screw from a difficultly accessible location.

This new screw driver is particularly adapted to be used with relatively fine machine parts where a powerful turning force is not needed, or with screws which are to be placed where there is insufficient head room for the use of a conventional screw driver.

It is to be understood that various modifications and changes may be made in this invention without departing from the spirit and scope thereof as set forth in the appended claim.

The invention described herein may be manufactured and used by or for the Government of the United States of America for governmental purposes without the payment of any royalties thereon or therefor.

What is claimed is:

A screw driver comprising a handle having a bearing at one end, a blade having a shank rotatably supported in said bearing and at right angles to said handle and a turning means comprising a knurled shaft operably connected to said shank by means of a coil spring, and a retractable screw holder slidably mounted on said handle and having a pair of flexible prongs adapted to engage the stem of a screw at a point away from the screwhead to support said screw in a position to be operated on by said blade.

STEPHEN P. WHEELER.

REFERENCES CITED

The following references are of record in the file of this patent:

UNITED STATES PATENTS

| Number | Name | Date |
|---|---|---|
| 519,354 | Sheppard | May 8, 1894 |
| 698,418 | Sprague | Apr. 22, 1902 |
| 1,259,777 | Rahnn | Mar. 19, 1918 |
| 1,417,995 | Hilton | May 30, 1922 |
| 1,507,990 | Donaldson | Sept. 9, 1924 |